United States Patent [19]
Hattori

[11] 4,294,506
[45] Oct. 13, 1981

[54] OPTICAL SCANNER WITH ANAMORPHIC OPTICAL SYSTEM

[75] Inventor: Nobuoto Hattori, Hachioji, Japan

[73] Assignee: Olympus Optical Company Ltd., Tokyo, Japan

[21] Appl. No.: 969,849

[22] Filed: Dec. 15, 1978

[30] Foreign Application Priority Data

Dec. 26, 1977 [JP] Japan ................... 52/156954

[51] Int. Cl.³ ............................................. G02B 27/17
[52] U.S. Cl. ..................................................... 350/6.8
[58] Field of Search ........................... 350/6.5–6.91, 350/190

[56] References Cited

U.S. PATENT DOCUMENTS

| | | | |
|---|---|---|---|
| 3,750,189 | 7/1973 | Fleischer | 350/190 |
| 3,865,465 | 2/1975 | Tatuoka et al. | 350/6.8 |
| 4,121,883 | 10/1978 | Goshima et al. | 350/6.8 |

*Primary Examiner*—Jon W. Henry
*Attorney, Agent, or Firm*—Weinstein & Sutton

[57] ABSTRACT

An optical scanner includes a multi-faceted rotating mirror which reflects light beam from a laser unit, and a condenser lens which focuses the beam as a scanning spot on a scanning surface. An anamorphic optical system comprising a cylindrical lens is disposed between the mirror and the surface, and focuses the beam on the surface in the scan direction, but focuses the beam on a plane short of the scanning surface in a direction perpendicular to the scan direction. An optical element having a magnification of projection which is equal to or less than unity and having a refracting or focussing force only in a direction perpendicular to the scan direction is disposed between the plane and the scanning surface.

8 Claims, 6 Drawing Figures

OPTICAL SCANNER WITH ANAMORPHIC OPTICAL SYSTEM

BACKGROUND OF THE INVENTION

The invention relates to an optical scanner, and more particularly, to an arrangement for compensating for a displacement of a scanning spot which results from an inclination from a reference plane of a multi-faceted rotating mirror used in light beam scanning apparatus.

An optical scanner generally used in facsimile systems, optical printers or the like comprises a light beam scanner which employs a multi-faceted rotating mirror. Such a scanner directs a collimated light beam from a light source to a facet of a polyhedron such as hexahedron or octahedron, which reflects and focuses the beam onto a scanning surface. Rotation of the mirror in one direction performs a scanning of the focussed light spot across the scanning surface.

FIG. 1 shows an example of the prior art optical scanner. Multi-faceted rotating mirror 2 is rotatably mounted on support shaft 1 for rotation in one direction. A collimated light beam from a laser (not shown) impinges on one facet thereof. After reflection by reflecting surface 2a of the mirror, the beam is passed through condenser lens 3, which comprises a spherical lens, and is focussed onto a scanning surface 4 disposed in the focal plane of the condenser lens 3 as a scanning light spot. As mirror 2 rotates, the spot travels across and thus scans the surface 4. For the convenience of subsequent description, the direction indicated by optical axis 5 will be referred to as X-axis, the direction along which the beam scan takes place as Y-axis, and the axis of shaft 1 as Z-axis.

In the optical scanner thus constructed, the rotation of mirror 2 at a high speed may cause an oscillation thereof, producing an inclination of the reflecting surface to cause the light spot to be offset from the normal scan direction. Where the scanning surface represents an original and is conveyed in the direction of the Z-axis, this produces an error in the line-to-line spacing which is usually referred to as a pitch error.

Considering this arrangement more closely with reference to FIG. 2, if the reflecting surface $2a$ has an angle of inclination $\Delta\theta$ with respect to the Z-axis as a result of an error in the manufacturing process or an oscillation during the rotation of the mirror, the collimated beam from the light source will impinge on the reflecting surface $2a$ with an angle of incidence $\Delta\theta$ and be reflected at an angle of reflection $\Delta\theta$, so that the reflected beam will have an angle of $2\Delta\theta$ with respect to the X-axis when passing through condenser lens 3. Consequently, the spot will be displaced on the scanning surface 4 by a distance $\Delta Z = 2\Delta\theta \cdot f_s$ displaced from the optical axis 5 where $f_s$ represents the distance between condenser lens 3 and surface 4 or the focal length at the lens. For a small angle $\Delta\theta$, we have $2\Delta\theta \approx \tan 2\Delta\theta$, and hence $$\Delta Z = f_s \tan 2\Delta\theta$$

Such disadvantage can be overcome by the use of a cylindrical lens which prevents a pitch error in the event the reflecting surface is inclined, as disclosed in U.S. Pat. application Ser. No. 190,024.

Such scanner is illustrated in FIG. 3. Referring to this Figure, a light beam from laser 16 is adapted to impinge on reflecting surface $12a$ of a multi-faceted rotating mirror 12. The scanner includes a first convex, cylindrical lens 17 disposed in the optical path extending between the laser 16 and the mirror 12 for focussing the impinging beam in the axial direction of shaft 11 which is associated with the mirror 12, or in the direction of Z-axis, and a second convex, cylindrical lens 18 disposed between the mirror 12 and a condenser lens 13, which is a spherical lens similar to lens 3 of FIGS. 1 and 2, for refracting the reflected beam only in the direction of the Z-axis or in a direction perpendicular to the scan direction. Mirror 12 is coaxially secured to the free end of shaft 11, which is rotatably supported by bearing 19. The opposite end of shaft 11 fixedly carries drive pulley 20, which is engaged by endless belt 23 which also extends around pulley 22 fixedly mounted on the output shaft 21a of drive motor 21, thus driving mirror 12 for rotation in one direction.

In the arrangement described, the beam impinging on reflecting surface $12a$ is focussed in the axial direction of shaft 11 or in the direction of the Z-axis by convex lens 17 which is disposed so that the reflecting surface $12a$ is located on the focal position thereof, whereby a light image on reflecting surface $12a$ will be a linear image which is perpendicular to the Z-axis. The reflected image passes through second lens 18, and is focussed by condenser lens 13 onto the surface 14 as a light spot in a manner similar to the prior arrangement as far as the scan direction or the direction of Y-axis is concerned. Like condenser lens 13, the second convex cylindrical lens 18 is disposed so that the reflecting surface $12a$ and the scanning surface 14 are located conjugate to each other as far as the Z-axis component of ray is concerned. In this manner, the image which is focussed onto the surface 14 represents a spot, the position of which in the direction of the Z-axis remains unchanged if surface $12a$ is inclined from Z-axis to result in an incidence of the linear image reflected thereby onto the second lens 18 at an angle to change the optical path along which it passes from the convex cylindrical lens 18 to the condenser lens 13. Thus, a pitch error which usually results from an inclination of the rotating mirror is substantially completely avoided.

However, in the optical scanner arrangement described above, it is necessary to focus a light image of a narrow line on the surface $12a$. If the scanning surface 14 comprises a recording member of a low sensitivity which is scanned by a high output beam from argon laser having a power output exceeding 10 W, the incidence of the beam onto the reflecting surface $12a$ will cause a temperature rise at the spot where it impinges, disadvantageously causing a deformation or damage of the reflecting surface $12a$ or burning of foreign matters deposited thereon which result in a degraded reflectivity.

SUMMARY OF THE INVENTION

It is an object of the invention to provide an optical scanner which eliminates the described disadvantages of the prior art by the use of an anamorphic optical system having different focal positions for the scan direction and for another direction which is at right angles thereto.

In accordance with the invention, the reflection by the rotating mirror takes place without forming the reflected beam into a linear form or reducing the size thereof, thus avoiding a deformation, damage or a degraded reflectivity which may result from a temperature rise of the reflecting surface of the rotating mirror while maintaining a sufficiently small light spot and reducing a pitch error associated with an inclination of the rotating mirror to a degree which is sufficient for practical purposes.

DESCRIPTION OF PREFERRED EMBODIMENTS

Figure 1:
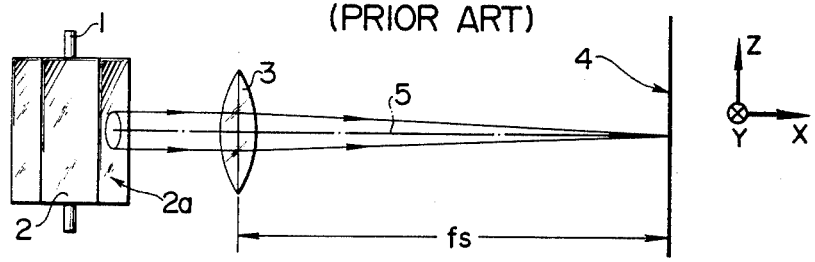
FIG. 1 is a diagrammatic view of an optical system used in conventional optical scanner.
Figure 2:
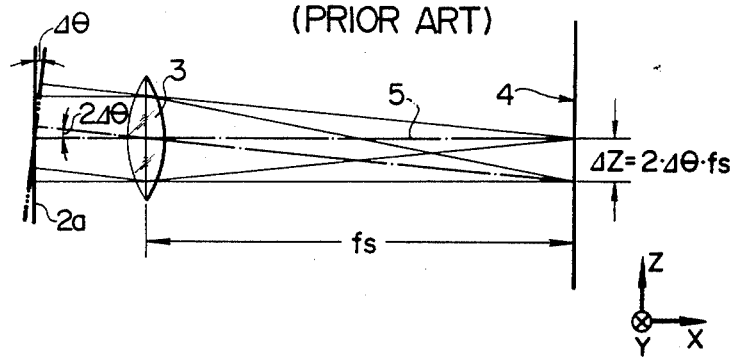
FIG. 2 is a similar view illustrating the difficulty which is experienced with the optical system of FIG. 1.
Figure 3:
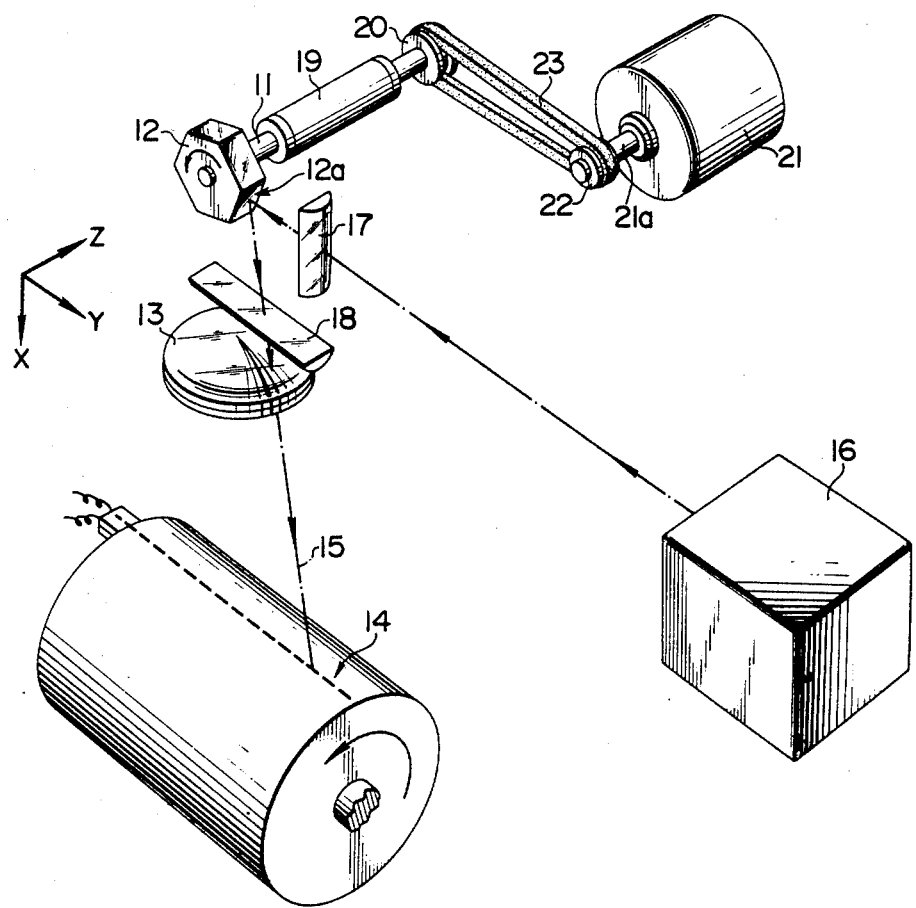
FIG. 3 is a perspective view of a prior optical scanner which has been proposed to avoid a pitch error.
Figure 4:
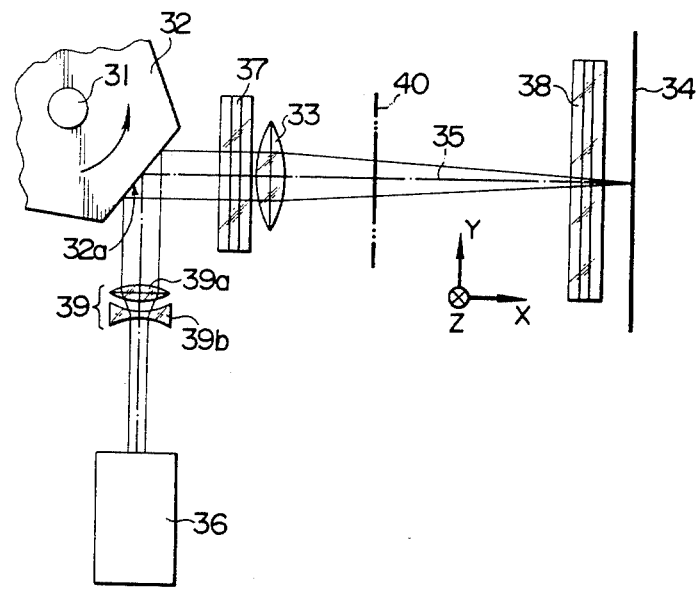
FIG. 4 is a schematic front view of an optical scanner according to one embodiment of the invention.

FIG. 4 is a front view of an optical scanner according to one embodiment of the invention. As shown, light from a light source 36 formed by a laser unit is passed through an expander lens 39 comprising a convex lens 39a and a concave lens 39b and which converts it into a collimated light beam having a given diameter. The beam impinges on the reflecting surface 32a of a multi-faceted rotating mirror 32, which is mounted on a shaft 31 for rotation in a direction indicated by an arrow. As the mirror 32 rotates, the collimated beam is reflected toward a scanning surface 34.

An anamorphic optical system comprising a first convex cylindrical lens 37 and a condenser lens 33 which is formed by a spherical lens is disposed intermediate the multi-faceted rotating mirror 32 and the scanning surface 34. The system focuses a spot on the scanning surface 34 in the scan direction or in the direction of the Y-axis while it focuses a spot on a plane 40 or short of the scanning surface 34 in the direction of the Z-axis (see FIG. 5). A second convex cylindrical lens 38 is disposed between the focal plane 40 and the surface 34, and has a refracting or focussing power only in a direction perpendicular to the scan direction or in the direction of the Z-axis and a magnification of projection which is equal to or less than unity. The purpose of the lens 38 is to project the light which is focussed on the plane 40 to and focuses it on the surface 34 (see FIG. 5).

Thus, both the first and second cylindrical lenses 37, 38 have a refracting power only in the direction of the Z-axis, but have no refractive power in the direction of the Y-axis. The condenser lens 33 is spaced from the scanning surface 34 by a distance $f_s$ which is equal to its focal length. Thus the reflected beam will be focussed on the surface 34 as far as the Y-axis is concerned.

Figure 5:
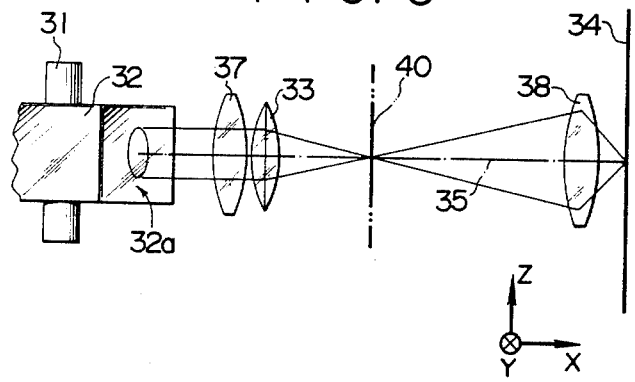
FIG. 5 is a plan elevation of the optical system of the optical scanner of FIG. 4.
Figure 6:
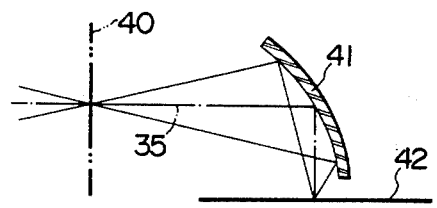
FIG. 6 is a fragmentary cross section of another form of the optical system.

The refracting power of the first cylindrical lens 37 is chosen such that the beam is focussed on the plane 40 short of the second cylindrical lens 38 as far as the Z-axis is concerned since the composite focal length of the elements 37, 33 in refracting the beam in the direction of the Z-axis is 1/m times the focal length $f_s$ of the condenser lens 33 where m is greater than unity. The second cylindrical lens 38 is disposed so that the plane 40 and the surface 34 are optically conjugate to each other with respect to the lens 38. The lens 38 has a refractive index so that its magnification of projection is equal to 1/n where n is greater than unity. When thus arranged, the conjugacy of the focal plane 40 and the scanning surface 34 with respect to the second cylindrical lens 38 assures that the beam which is focussed on the plane 40 in the direction of the Z-axis will be again focussed on the surface 34, as shown in FIG. 5, forming a scanning spot on the latter surface 34.

In operation, assuming that the reflecting surface 32a of the multi-faceted rotating mirror 32 has an angle of inclination of $\Delta\theta$ as viewed in the direction of the Z-axis, the beam reflected by the reflecting surface 32a will deviate from the Z-axis by angle of $2\Delta\theta$, whereby its focussed position on the plane 40 will be displaced by a distance of $d_1=(f_s/m)2\Delta\theta$ from the X-Y plane including optical axis 35. Since the cylindrical lens 38 has a magnification n when it projects an image on the plane 40 onto the scanning surface 34, the corresponding spot formed on the surface 34 will be displaced by an amount of $d_1/n$ in the direction of the Z-axis. Thus resulting deviation $\Delta Z_O$ will be equal to $2f_s\cdot\Delta\theta/mn$.

However, it is to be noted that the magnitude of the deviation $\Delta Z_O$ can be said to be minimal when it is compared with the corresponding magnitude of deviation which occurs in the conventional arrangement which does not include the cylindrical lenses 37, 38. Specifically, the magnitude of the deviation or pitch error will be $2f_s\cdot\Delta\theta$ in the conventional arrangement, but can be reduced by a factor of mn in the arrangement of the invention. By way of example, by choosing m=2 and n=10, the magnitude of the pitch error can be reduced by a factor of 20 as compared with the prior art arrangement, thus affording practical utility.

It should be understood that the invention is not limited to the precise construction shown and described. By way of example, the first cylindrical lens 37 may be transposed to the other side of the condenser lens 33. Alternatively, the second cylindrical lens 38 may be replaced by a cylindrical, concave mirror 41 to scan a scanning surface 42 which is disposed in parallel relationship with the optical axis 35. The multi-faceted mirror may comprise a pyramid. Additionally, each of the first and second cylindrical lenses may comprise a combination of convex and concave cylindrical lenses to provide a color correction, provided the total refracting power is positive. Also, the anamorphic optical system need not be a combination of a cylindrical lens and a condenser lens.

What is claimed is:

1. An optical scanner comprising a laser unit for producing a collimated light beam, a multi-faceted rotating mirror for receiving said collimated light beam and reflecting it to a scanning surface, an anamorphic optical system disposed between said rotating mirror and said scanning surface for focussing said beam on the latter surface in a scan direction and for focussing said beam on a plane located short of said scanning surface in a direction perpendicular to said scan direction, said anamorphic optical system comprising a first lens which has a focussing power only in a direction perpendicular to said scan direction and a second lens, said first and second lenses disposed between said rotating mirror and said plane for focussing said beam on said plane at a location short of said scanning surface, and an optical element disposed between said plane and said scanning surface and having a focussing power only in a direction perpendicular to said scan direction and having a magnification of projection which is equal to or less than unity, said optical element projecting said beam which is focussed on said plane onto said scanning surface to focus said beam thereon.

2. An optical scanner according to claim 1 in which the optical element comprises a convex cylindrical lens.

3. An optical scanner according to claim 1 in which the optical element comprises a cylindrical concave mirror.

4. An optical scanner for reducing deviation of a reflected light beam from an optical axis, comprising a laser unit for producing a collimated light beam, a multifaceted rotating mirror for receiving said collimated light beam and reflecting it to a scanning surface along said optical axis, an anamorphic optical system disposed between said rotating mirror and said scanning surface and including first optical means disposed between said scanning surface and a plane short of said scanning surface for focussing said light beam on the scanning surface to reduce deviation from said optical axis by a first factor which is greater than unity and including second optical means disposed between said rotating mirror and said plane for focussing said light beam on said plane in a direction perpendicular to said scan direction to further reduce deviation from said optical axis by a second factor which is greater than unity, said second optical means including a cylindrical lens having a focussing power only in a direction perpendicular to said scan direction and a condenser lens which is formed by a spherical lens, wherein the total deviation of said reflected light beam from said optical axis when focussed on said scanning surface is reduced by the product of said first and second factors.

5. An optical scanner in accordance with claim 4 wherein said first optical means includes a lens disposed between said plane and said scanning surface and said second optical means includes lenses disposed between said rotating mirror and said plane.

6. An optical scanner in accordance with claim 4 wherein said first optical means has a focussing power in a direction perpendicular to said scan direction and a magnification of projection which is equal to or less than unity.

7. An optical scanner in accordance with claim 6 wherein said first optical means includes a cylindrical lens.

8. An optical scanner in accordance with claim 4 wherein said first optical means comprises a concave mirror for focussing rays from said second optical means upon said scanning surface.

* * * * *

UNITED STATES PATENT AND TRADEMARK OFFICE
CERTIFICATE OF CORRECTION

PATENT NO. : 4,294,506

DATED : October 13, 1981

INVENTOR(S) : Nobuoto Hattori

It is certified that error appears in the above—identified patent and that said Letters Patent is hereby corrected as shown below:

Column 1, line 56, change "at" to --of--.

Signed and Sealed this

First Day of June 1982

[SEAL]

Attest:

GERALD J. MOSSINGHOFF

*Attesting Officer*  *Commissioner of Patents and Trademarks*